United States Patent [19]

Bayan et al.

[11] Patent Number: 4,975,308

[45] Date of Patent: Dec. 4, 1990

[54] MOLDED PHARMACEUTICAL PRIMARY CLOSURE

[75] Inventors: Ghawamedin Bayan, West Chester; Charles H. White; Richard H. Lusch, both of Phoenixville, all of Pa.; Malcolm A. Smook, Wilmington, Del.

[73] Assignee: The West Company, Phoenixville, Pa.

[21] Appl. No.: 288,443

[22] Filed: Dec. 22, 1988

[51] Int. Cl.$^5$ .................. C08L 53/02; C08L 15/02; A61J 1/20; A61J 1/14; A61J 1/05
[52] U.S. Cl. ............................ 428/34.1; 220/309; 525/98; 525/194; 428/35.7
[58] Field of Search ............... 525/194, 98, 232, 383, 525/382; 428/36.9, 36.92, 34.1

[56] References Cited

U.S. PATENT DOCUMENTS

| | | | |
|---|---|---|---|
| 3,104,235 | 9/1963 | Kuntz et al. | 525/382 |
| 4,048,254 | 9/1977 | Lawrence et al. | 428/36.92 |
| 4,048,255 | 9/1977 | Lawrence et al. | 525/89 |
| 4,130,534 | 12/1978 | Coran et al. | 525/232 |
| 4,607,074 | 8/1986 | Hazelton et al. | 525/193 |
| 4,616,052 | 10/1986 | Habibullah | 524/526 |
| 4,684,672 | 8/1987 | Buchanan et al. | 525/194 |
| 4,810,752 | 3/1989 | Bayan | 525/194 |

*Primary Examiner*—Carman J. Seccuro
*Attorney, Agent, or Firm*—Eugene E. Renz, Jr.

[57] ABSTRACT

A molded pharmaceutical primary closure including a thermoplastic elastomer molded into the shape of a closure and having a compression set less than about forty percent, an oxygen transmission rate of less than 500 cc/m$^2$/day, a moisture vapor transmission rate of less than 2 gm/m$^2$/day, and a needle penetration force of less than 2000 grams.

4 Claims, 1 Drawing Sheet

MOLDED PHARMACEUTICAL PRIMARY CLOSURE

FIELD OF THE INVENTION

The present invention relates to molded pharmaceutical primary closures such as stoppers, and more particularly to blood tube stoppers useful in combination with a pharmaceutical tube. The closure is formed from a thermoplastic elastomer and has properties which prevent contamination from the environment, particularly when the tube contains blood which has been taken as a sample from a patient for laboratory testing.

BACKGROUND OF THE INVENTION

For a variety of reasons, thermoplastic elastomers are not used in the pharmaceutical industry in great quantities. Because of extremely high quality control and concern for the integrity of the product contained in pharmaceutical containers, thermoplastic elastomers have been slow to be accepted as candidates for container closures. Of particular concern are those pharmaceutical primary closures which need to provide a satisfactory barrier to moisture and oxygen and at the same time not allow undesirable materials to be extracted from the closure into the contents. The property of being able to withstand or maintain vacuum for long periods of time is important if container or its contents are stored for a long time.

One particular line of closures in the pharmaceutical industry which has a great but unsatisfied need for improvement are those closures which are used as blood tube stoppers. These products are particularly sensitive to contamination of the blood contained in the tube either by extraction from the container or closure, or from external contamination. Particularly of concern is the leakage of moisture and/or oxygen through the elastomeric closure to adversely affect the blood which is contained in the tube. At the same time, it is absolutely essential that the elastomeric closures function as a true stopper, being sufficiently elastomeric to conform to the shape of the tube, and being readily insertable into the tube. It is also essential that the closure be suitable for penetration by a needle when the contents are either added to or removed from the tube.

This particular need for appropriate closures in the pharmaceutical industry is not easily satisfied even by thermoset products. Some forms of butyl rubber in a thermoset formulation have been compounded which are suitable for use as blood tube stoppers. Butyl rubber products can be permanently crosslinked to form thermosetting compositions using curing systems which do not contaminate the product. Attempts to provide thermoplastic elastomers based upon butyl rubber formulations have, in part, been successful for some applications such as molded mechanical goods and the like. However, these formulations have been uniformly unsuitable for use in the pharmaceutical industry.

For example, U.S. Pat. No. 4,130,534 describes a thermoplastic composition containing polyolefin resins and crosslinked butyl rubber. The product is formed by dynamic vulcanization, in which the rubber is the continuous phase prior to crosslinking but becomes the dispersed phase after the crosslinking step. These products are used for tires, hoses, belts, gaskets and the like.

In U.S. Pat. No. 4,504,842, an adhesive using halogenated butyl rubber combined with block thermoplastic polymers is described in which zinc oxide is used to increase the strength of the product. Zinc oxide, it should be noted, it particularly undesirable in pharmaceutical applications due to the adverse affects of zinc ions as a contaminant.

Dynamic vulcanization itself is extensively described in U.S. Pat. No. 4,593,062. This patent is directed to molded parts for automobile hoses and external body parts. In another patent which describes dynamic vulcanization, the second rubber, preferably EPDM, is employed with the zinc oxide cure system as shown in U.S. Pat. No. 4,607,074. Again, gaskets, seals and the like are described as the end products.

U.S. Pat. No. 4,616,064 is one of very few patents which describe the use of thermoplastic materials in the medical field. This patent describes a mixture of polyolefins, SEBS polymers and materials such as polysiloxanes. These materials are suggested to be useful as tubing, particularly when in contact with human skin. These elastomers are incapable of providing a barrier to moisture and oxygen. Furthermore, they would be nonfunctional as primary closures for pharmaceutical containers.

Finally, U.S. Pat. No. 4,616,052 discloses high temperature creep resistant thermoplastic elastomer compositions which may be used in a variety of medical applications. The primary advantage described by this patent is the ability to withstand temperatures such as those encountered during autoclaving. The principal components of the product are dynamically vulcanized ethylene-propylene-diene terpolymer and polypropylene. The composition also includes a small amount of butyl rubber in the range of about 5 to about 20 percent.

None of the system described above is capable of providing a suitable composition for use in the pharmaceutical industry. Accordingly, it is an object of this invention to provide a thermoplastic elastomer composition which is useful as a molded primary closure for the pharmaceutical industry. This product should be suitable for use in combination with a pharmaceutical tube as a stopper. The object of this invention is to provide a composition which has properties which protect pharmaceutical products which are contained in an appropriate container. More particularly, it is an object of this invention to provide an improved blood tube stopper for use in the pharmaceutical industry.

SUMMARY OF THE INVENTION

The present invention provides thermoplastic elastomer compositions which are molded into the shape of a closure and which have good compression set, an oxygen transmission rate less than 500 cc/m$^2$/day, a moisture vapor transmission barrier less than 2 gm/m$^2$/day, and a needle penetration force of less than 2,000 grams. These compositions are most suitable for use as blood tube stoppers in combination with pharmaceutical tubes where the elastomer functions as a primary closure. These compositions are particularly valuable in pharmaceutical and medical environments because there is a reduced risk that the vulcanization curing agents will be extracted by the contents of the container. There is, in dynamic vulcanization, some encapsulation around the rubber to make the closure cleaner, because continuous phase serves to further reduce the ability of liquids to extract curing agents and the like. These stoppers have low curing and satisfactory reseal properties.

In a preferred embodiment, the present invention includes the use of a halobutyl rubber which is cured by dynamic vulcanization in the presence of at least 20 parts of a thermoplastic continuous phase, based upon 100 parts of the rubber. In a more preferred embodiment, the thermoplastic continuous phase is formed from a mixture of 10 to 60 parts of a polyolefin and 1 to 90 parts of a thermoplastic elastomer and/or any other elastomer that does not crosslink during the dynamic vulcanization.

The preferred polyolefins are polypropylene and polyethylene. The preferred thermoplastic are thermoplastic elastomeric block copolymers having terminal polystyrene units.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

As was stated above, the present invention comprises a molded pharmaceutical primary closure in which a thermoplastic elastomer is molded into the shape of the closure. The thermoplastic elastomer has a compression set less than about 40%, an oxygen transmission rate of less than 500 cc/m$^2$/day, a moisture vapor transmission rate of less than 2 g/m$^2$/day and a needle penetration force of less than 2,000 grams.

For the purposes of this invention, thermoplastic elastomers are defined as polymeric materials that exhibit elastic properties that are usually only associated with vulcanized rubber at room temperature. These polymeric materials can be processed in conventional thermoplastic processing equipment such as extruders, injection molding machines, blow molding machines, etc. The elastomeric properties of resiliency and low tension or compression set are reflected in the ability of the thermoplastic elastomers to return to essentially the original dimensions after deformation.

In order to be effective as a primary closure in the pharmaceutical industry, it is necessary that the closure of this invention function as a thermoplastic elastomer. While many materials are thermoplastic and many other materials are elastomers, it has been found that both properties are necessary to provide the effective primary closures of this invention. Specifically, the material can be processed in conventional thermoplastic processing equipment so that it would have the advantage of process precision and efficiency as well as potential cost savings and recyclability.

At the same time, the material must be non toxic and relatively clean of extractable components or it will not have any utility as a stopper. For example, typical elastomeric materials which are formulated for automobile parts are not suitable for use in molded pharmaceutical closure, particularly in combination with glass containers.

Figure 1:
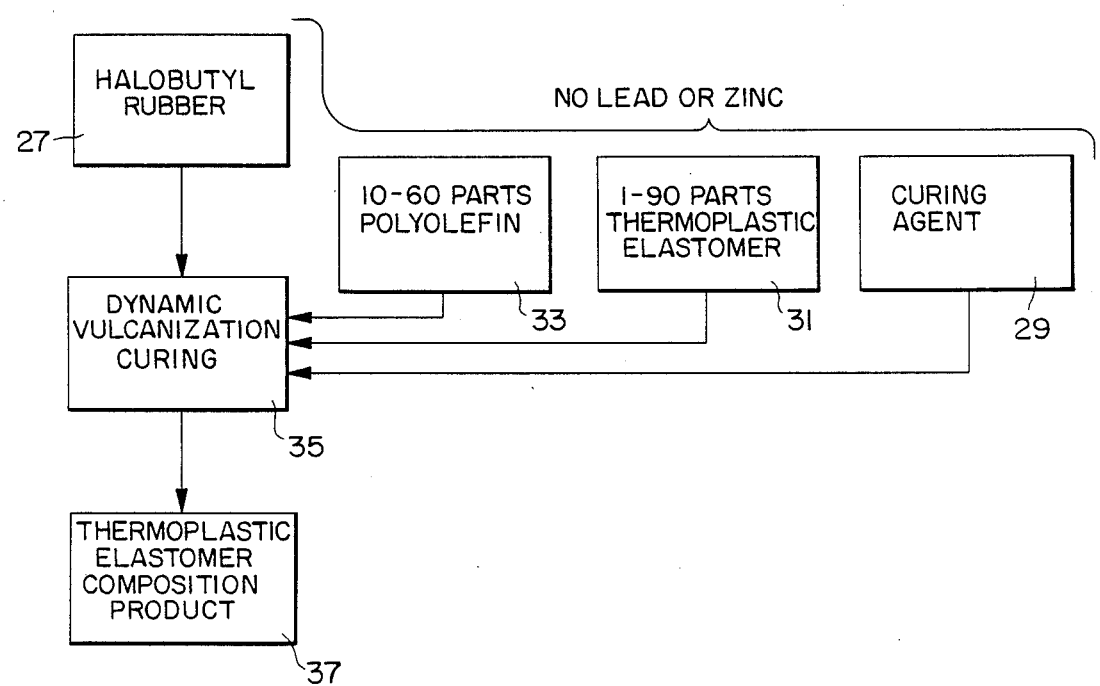
FIG. 1 is a schematic block diagram describing a process for preparing a material suitable for molding into the primary closure of the present invention.
Figure 2:
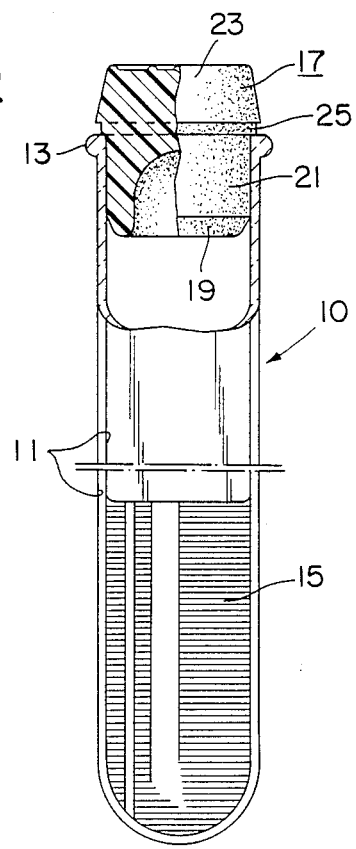
FIG. 2 is a view showing one typical product of this invention, partially in section, used in combination which a tube containing a blood sample.

In a preferred embodiment, shown in FIG. 1, the process of manufacturing a thermoplastic elastomer composition product of the type described herein is shown. A preferred material, halobutyl rubber 27 is added to a system including a curing agent 29, a thermoplastic elastomer 31 and a polyolefin 33. Dynamic vulcanization takes place in the appropriate equipment 35 and the resulting thermoplastic elastomer is molded into a suitable product. The vulcanizing agents 29 must not contain lead and zinc.

The assembly shown generally by the reference numeral 10 consists of a glass or plastic tube 11 having an end 13 adapted to receive a primary closure. The tube 11 contains, for example, a sample of human blood 15. The primary closure 17 is inserted into end 13 of pharmaceutical tube 11 to form a tight seal. The stopper 17, manufactured from a thermoplastic elastomer of the type described herein, has a tapered end portion 19 to permit easy insertion into the end 13 of the tube 11. The body 21 forms a tight and effective seal preserving the integrity of the blood 15 contained in the tube 11. A ridge 25 separates the upper portion 23 from the sealing portion 21, to permit removal of the closure 17 and to ensure that the closure 17 is inserted to an adequate depth in the tube 11.

Typically, a tube and stopper are assembled in a vacuum chamber to create a vacuum in the empty tube. These tubes are then shipped to hospitals and other end users where blood is eventually placed in the tube. The stopper should be able to maintain the vacuum for months prior to use.

As has been stated, the preferred thermoplastic elastomeric composition includes a major portion of halobutyl rubber. While halobutyl rubber itself when crosslinked fully is not a thermoplastic elastomer, the inclusion of halobutyl rubber as the dispersed phase in a continuous matrix formed during the dynamic vulcanization of halobutyl rubber results in an end product which itself is a thermoplastic elastomer according to the defination given above. This resulting product acquires some of the important elastomeric properties of the halobutyl rubber while keeping the important properties of a thermoplastic material. Accordingly, the resulting end product has oxygen and moisture vapor permeability properties which are lower than to typical thermoplastic elastomers which do not even approach the required barrier limits as described herein.

Preferred thermoplastic elastomeric compositions are disclosed in my copending application entitled HALOBUTYL THERMOPLASTIC ELASTOMERIC, Ser. No. 194,894 filed May 17, 1988, now U.S. Pat. No. 4,810,752 the disclosure of which is incorporated herein by reference.

One of the primary factors which determines the acceptability of a primary closure in the pharmaceutical industry is the ability of the material to prevent the transmission of moisture vapor through the elastomeric closure formulation. It has been found that when a thermoplastic elastomer is molded into the shape of a closure, and has a moisture vapor transmission barrier less than 2 gm/m$^2$/day, it can be employed effectively.

For the purposes of this invention, moisture vapor transmission rate which is acceptable for pharmaceutical purposes is defined as being less than the 2 grams/m$^2$/day. The actual value for various thermoplastic elastomers is determined using a method which measure the moisture vapor transmission rate through an elastomeric closure formulation which has been molded into a 35 mil thick test plate. Testing is performed with a Mocon Permatran Water Vapor Transmission Rate Tester which employs an infrared detector. The detector output, displayed by a strip chart recorder, is a linear function of the transmission rate of moisture through the test plate. In measuring the transmission rate, the variables of temperature, air flow, relative humidity, test plate thickness and conditioning time are all maintained constant. Accordingly, a moisture vapor transmission rate is obtained.

In the present invention, values have been measured and are expressed in grams/m$^2$/day. For consistency, the moisture vapor transmission rate is measured at 37.8 degrees C and 90% relative humidity. Samples are placed in a stabilizing chamber to condition them to a specified temperature and humidity for an average of four days. In order to assure dependability of the testing, the samples are tested and returned to the storage compartment to be retested after a period of 24 hours or so. When the value remains the same, that is, plus or minus 0.01 grams per m$^2$ per day, the sample is considered to be in equilibrium and the values are reproducible.

Presented below in Table I are the results of a number of tests performed to measure the moisture vapor transmission rate for different primary pharmaceutical closures. The same procedure described above was used for each sample, under identical testing conditions.

TABLE I

| Experiment No. | Closure Composition | Moisture Vapor Rate g/m$^2$/day |
| --- | --- | --- |
| 1 | Halobutyl TPE | 0.4 |
| 2 | Butyl Thermoset | 0.65 |
| 3 | EPDM TPE | 2.71 |
| 4 | SEBS TPE | 1.25 |
| 5 | EPDM Thermoset | 2.5 |

Oxygen transmission rate is measured by passing oxygen through an elastomeric closure formulation which has a 35 mil thickness. Testing is performed using an OX-TRAN. This unit utilizes a coulometric cell which is a constant current generator. The output of the generator is a linear function of the mass flow rate of oxygen into the cell. The cell current is displayed in terms of the DC voltage developed across a fixed load resistance in the cell circuit. Oxygen transmission rate is conveniently related with the observed voltage as measured in millivolts.

The rate of oxygen transmission is expressed in cc/m$^2$/day by most laboratories. In order to operate the test procedure, a thirty five mil test plate is placed in a test station and conditioned for at least 24 hours at room temperature prior to the test. Six readings are taken from the sample and the average is multiplied by two. This doubling of the result is required because the concentration of oxygen is fifty percent in the tank. The results of various tests are presented below in Table II.

TABLE II

| Experiment No. | Closure Composition | Oxygen Transmission cc/m$^2$/day |
| --- | --- | --- |
| 6 | Halobutyl TPE | 287 |
| 7 | Halobutyl Thermoset | 214 |
| 8 | EPDM TPE | 3827 |
| 9 | SEBS TPE | 1302 |
| 10 | EPDM Thermoset | 3000 |

Using an Instron tension and compression measuring unit, one measures the force required to penetrate a blood tube stopper with the back end of a double ended needle. The tube and stopper are centered in a clamp and a needle is brought into contact with the stopper after appropriate calibration. The peak load required to penetrate the stopper is measured and recorded.

As mentioned above, the compression set is an important property for consideration in blood tube stoppers. Compression set is defined as a measure of the ability of an elastomeric material to retain elastic properties after prolonged action of compressive stresses.

The test procedure is performed on a test specimen of cylindrical shape, normally one-half inch in diameter by one-quarter inch in thickness. The spacer bar thickness is 0/178 inches. This cylindrical shaped test specimen is compressed under 25% deflection and maintained under this condition for a specified time and temperature. In the examples, the compression was maintained for 22 hours at 70° C.

After the test period has been completed, the test specimen is removed from the test apparatus and is allowed to rest at room temperature for thirty minutes. At this point the residual deformation is measured. The thickness of the specimen is measured before and after the test. The compression set value, as a percentage, is calculated by dividing the difference between the initial thickness and the final thickness by the initial thickness minus the spacer bar thickness. Multiplying by 100 gives a percentage value for compression set.

Shown below in Table III are values for compression set and needle penetration using the procedures described above.

TABLE III

| Experiment No. | Closure Composition | Compression Set, % | Needle Penetration, grams |
| --- | --- | --- | --- |
| 11 | Halobutyl TPE | 25 | 936 |
| 12 | Butyl Thermoset | 13 | 1589 |
| 13 | EPDM TPE | 24 | 962 |
| 14 | SEBS TPE | 30 | 984 |
| 15 | EPDM Thermoset | 25 | 1000 |

As can be seen, the present invention is capable of providing useful molded pharmaceutical closures and particularly blood tube stoppers which have not been heretobefore possible in the prior art.

What is claimed is:

1. A molded pharmaceutical primary closure for use with a container, comprising:
a thermoplastic elastomer molded into the shape of a closure sized to fit a container, said closure being formed from a halobutyl rubber cured by dynamic vulcanization in the presence of a continious phase of at least twenty parts of a mixture of polyolefin and a thermoplastic elastomeric block copolymer having terminal polystyrene units, per 100 parts of said rubber, said closure having a compression set less than about forty percent, an oxygen transmission rate of less than 500 cc/m$^2$/day, a moisture vapor transmission rate of less than 2 gm/m$^2$/day, and a needle penetration force of less than 2000 grams.

2. A molded pharamaceutical primary closure for use with a container, comprising:
a thermoplastic elastomer molded into the shape of a closure sized to fit a container, said closure being formed from a halobutyl rubber cured by dynamic vulcanization in the presence of at least 20 parts of a mixture formed from 10 to 60 parts of a polyolefin selected from polypropylene and polyethylene and 1 to 90 parts of a thermoplastic elastomeric block copolymer having terminal polystyrene units, said parts being based upon 100 parts of said rubber, said closure having a compression set less than about forty percent, and oxygen transmission rate of less than 500 cc/m$^2$/day, a moisture vapor transmission rate of less than 2 gm/m$^2$/day, and a needle penetration force of less than 2000 grams.

3. In combination, a pharamaceutical tube and tube stopper, said stopper comprising:

a molded thermoplastic elastomer sized to fit said tube and formed from a halobutyl rubber cured by dynamic vulcanization in the presence of a continuious phase of at least 20 parts of a mixture formed from 10 to 60 parts of a polyolefin and 1 to 90 parts of a thermoplastic elastomeric block copolymer having terminal polystyrene units, said parts being based upon 100 parts of said rubber, said stopper having a compression set less than about forty percent, an oxygen transmission rate of less than 500 cc/m$^2$/day, a moisture vapor transmission rate of less than 2 gm/m$^2$/day, and a needle penetration force of less than 2000 grams.

4. In combination, a pharamecutical tube and tube stopper, said stopper comprising:

a molded thermoplastic elatomer sized to fit said tube and formed from a halobutyl rubber cured by dynamic vulcanization in the presence of a continuous phase of at least twenty parts of a mixture formed from 10 to 60 parts of polypropylene or polyethylene and 1 to 90 parts of a thermoplastic elastomeric block copolymer having terminal polystyrene units, said parts being based upon 100 parts of said rubber, said stopper having a compression set less than about forty percent, an oxygen transmission rate of less than 500 cc/m$^2$/day, a moisture vapor transmission rate of less than 2 gm/m$^2$/day, and a needle penetration force of less than 2000 grams.

* * * * *